United States Patent [19]

Johanns

[11] 4,179,079
[45] Dec. 18, 1979

[54] PROCESS AND AN APPARATUS FOR LOADING A CASSETTE WITH AN ENDLESS ROLL

[75] Inventor: Heinz Johanns, Leverkusen, Fed. Rep. of Germany

[73] Assignee: AGFA-Gevaert A.G., Leverkusen, Fed. Rep. of Germany

[21] Appl. No.: 926,520

[22] Filed: Jul. 19, 1978

[30] Foreign Application Priority Data

Jul. 26, 1977 [DE] Fed. Rep. of Germany ....... 2733585

[51] Int. Cl.² ............... B65H 19/20; B65H 35/02; B65H 17/02
[52] U.S. Cl. .......................... 242/56 R; 242/56.8; 242/67.3 R
[58] Field of Search ........... 242/56 R, 67.1 R, 67.3 R, 242/58.1, 58.3, 56.8, 71.7, 197

[56] References Cited

U.S. PATENT DOCUMENTS

| | | | |
|---|---|---|---|
| 2,205,052 | 6/1940 | Stein | 242/67.3 R |
| 2,239,188 | 4/1941 | Boes | 242/67.3 R |
| 3,586,258 | 6/1971 | Horlezeder | 242/56.8 |
| 3,768,748 | 10/1973 | Pfefer | 242/71.7 |

Primary Examiner—Edward J. McCarthy
Attorney, Agent, or Firm—Connolly and Hutz

[57] ABSTRACT

The invention relates to a method and an apparatus for automatically loading a cassette with an endless roll of loosely wound film from a cut length of film strip. The film strip is led after deflection into a stationary track which is offset from the supply plane by a film width and corresponds to the path of the film guide passage of a cassette. The film is loosely wound onto a roll from the outside to the inside in a rotating winding chamber. Upon completion of the winding process the film is cut off and the free end is spliced with the other end to form an endless roll. Then the roll is pushed from the winding chamber into the cassette by means of an ejector.

4 Claims, 4 Drawing Figures

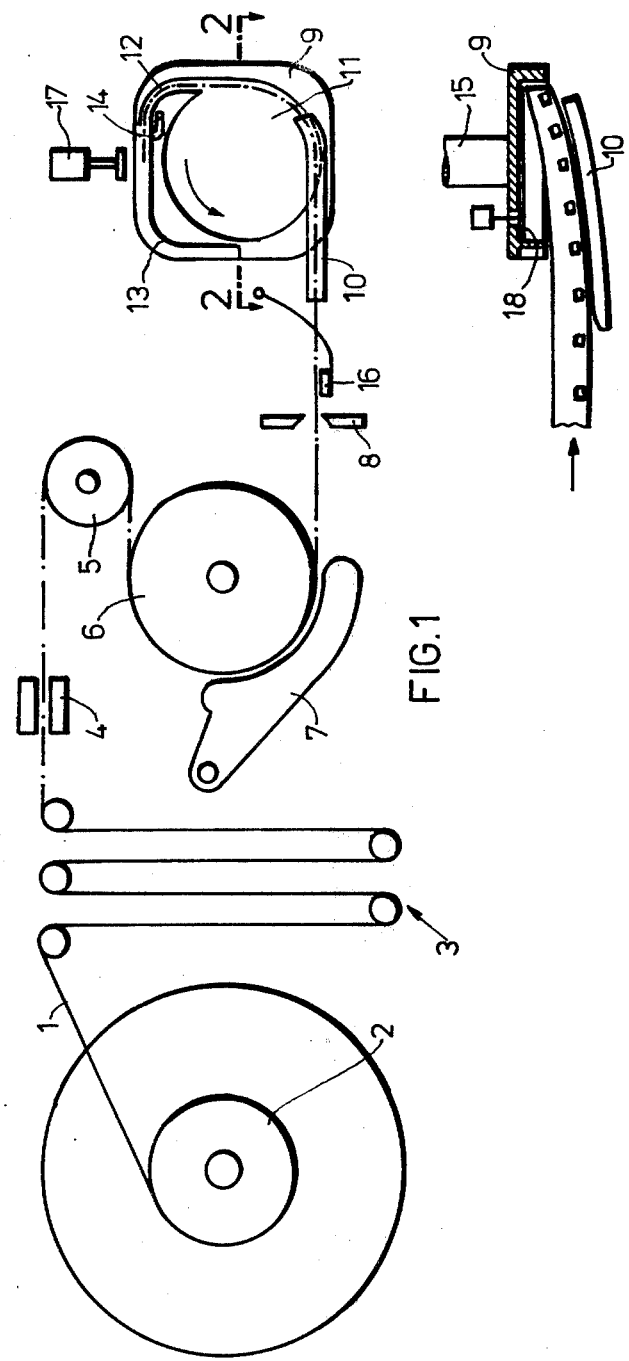

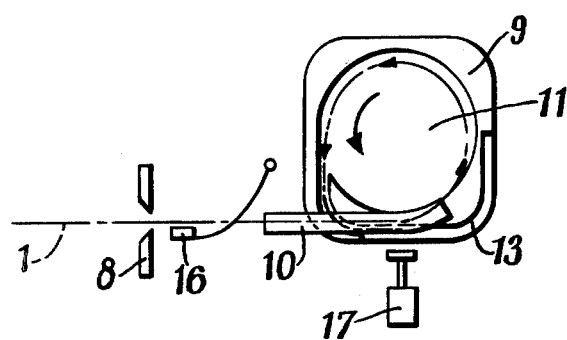
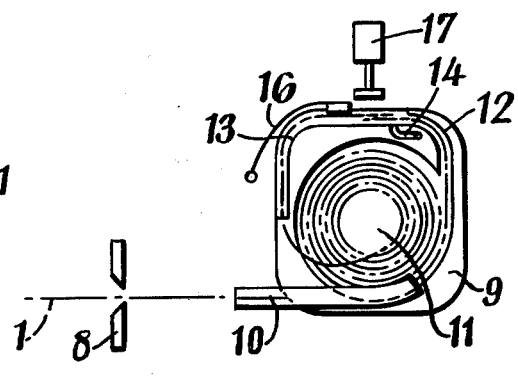

PROCESS AND AN APPARATUS FOR LOADING A CASSETTE WITH AN ENDLESS ROLL

The invention relates to a method and an apparatus for loading a cassette with an endless roll from a cut length of film strip.

For some shots, for example fading shots, it is necessary to be able to move the film strip in both directions. The endless film is a particularly desirable and space-saving arrangement, in which the film strip is conveyed via a passage, between the core and outer winding through a film transport engaging with the perforations, for exposure at the film gate.

In the past, such endless films were produced manually by pulling the ends of a roll of film out and splicing these ends using adhesive tape and then threading them into a cassette lying flat on the table.

Such handling is not economical in the case of bulk products such as, for example, Super 8 film. A great deal of skill is required owing to the springiness of the film strip and the narrow sinuous passages, particularly since the cassettes have to be loaded in the dark.

The object of the invention is to find a method and an apparatus for semi-automatically or fully-automatically loading a cassette with a loosely wound film strip, the ends of which are spliced together by adhesive tape to form an endless roll.

In accordance with the invention there is provided a method for loading a cassette with an endless roll from a cut length of film strip, in which (a) one end of film strip is supplied and led, after deflection, into a stationary track, which is offset from the supply plane by a film width and corresponds to the path of the film guide passage of a cassette from the outer winding of a roll to its film gate, and is then fixed at the end of the track, an adhesive surface being kept free for an adhesive tape;

(b) with the deflection maintained, a further portion of the film strip is supplied and is wound onto a roll, from the outside to the inside, in a rotating winding chamber which is joined to the track, and corresponds to the film take-up in a cassette;

(c) the film strip comes to a stand still upon completion of the winding process and is cut off and the free end is simultaneously displaced by a film width along a contour corresponding to the film guide passage of a cassette, from the inner winding of the roll to its film gate and pushed in front of the said one end of the film strip, where the film strip is spliced to form an endless roll with the aid of an adhesive tape and is then pushed into the parallel open film cassette by means of an ejector.

A particular advantage obtained with the invention is that the film may now be wound—according to its subsequent position in the cassette—so that additional stresses on the film of the type occurring when using the spindle are avoided. It was found that after introducing this displacement, the displacement appeared to remain throughout the entire winding process without further external intervention. As a result of the multi-dimensional bend at the point of deflection, the film strip is actually stabilised in shape sufficiently to maintain the direction in which it has been threaded and this was not expected owing to the instability and springiness of the film. In addition, the surrounding winding chamber has the advantage that any winding inserted is subjected to the centrifugal force which substantially prevents the well known drifting of the roll. At the same time, the rear wall of the winding chamber ensures accurate orientation of the individual windings.

According to a particular embodiment of the method, the circumferential speed of the chamber at the deflection is larger than the feed rate of the film strip.

Owing to the particular type of winding from the outside to the inside in a winding chamber, it is possible, by means of a relatively low feed to insertion rate, to produce slack windings, even with slackening which varies in the course of winding. This fulfils an important requirement for subsequent transportation of endless films since this property is maintained even after the endless roll of film is inserted in the cassette.

In a particular embodiment of the apparatus for carrying out the method, a shaped part, located at the end of a shaft, is arranged behind a guide element as a winding apparatus, and contains a winding chamber comprising a passage beginning at the periphery, whose inner wall corresponds to the path of a cassette passage and whose outer wall ends after a predetermined length in front of clamping elements which correspond to an adhesive tape mechanism at a specific position of the shaped part, a transporting arm is arranged to move from the severing blade to the clamping element, and an ejector is located in the shaped part.

The apparatus is simple in structure and is therefore very reliable and particularly easy to maintain.

In another embodiment of the apparatus, take-up elements for a cassette are arranged as the said shaped part. An obvious advantage of this embodiment is that the shaped part is no longer required since the film is wound directly into the cassette. In addition to the careful treatment of the film strip, the ejection of the endless roll is not required.

In the accompanying drawings:

FIG. 1 shows a schematic view of a winding station of this invention

FIG. 2 shows a schematic cross sectional plan a means for deflecting a film strip view taken through FIG. 1 along lines 2—2 showing in the winding station of FIG. 1;

FIG. 3 shows a plan view of the cassette rotated 180° with turn of film in the winding chamber; and FIG. 4 shows a plan view of the wound cassette at the splicing station.

In FIGS. 1 and 2, a film strip 1 is drawn from a supply spool 2 via a loop forming means 3, through a punch 4, round the deflecting roller 5, from a sprocket wheel 6, with pressure pads 7, and is fed through severing blades 8 for cutting the film, to a shaped part 9, and displaced by means of a guide element 10 in such a way that the beginning of the film finally, after passing through winding chamber 11 and passage 12, comes to rest on suction holes 14 of the shaped part 9 which form clamping elements once a vacuum has been applied. FIG. 3 illustrates rotating the shaped part 9 180° about shaft 15 and simultaneously supplying the film strip 1 by means of a sprocket wheel 6, a winding is inserted from the outside to the inside in the winding chamber 11.

Once the winding process has finished, as shown in FIG. 4 the end of the film strip 1 which is now free due to the action of severing blades 8, is brought, with the aid of a transporting arm 16, from the plane of the sprocket wheel 6 into the plane of the shaped part 9 and pushed on the inner wall 13 which corresponds to the path of the cassette passage in line with the beginning of the film where an endless roll of film is formed by splicing with adhesive tape from an adhesive tape mechanism 17. The finished film is pushed into the cassette (not shown) by ejector 18.

What we claim is:

1. A method for loading a cassette with an endless roll from a cut length of film strip disposed in a supply plane having a pair of ends which
   (a) one end of film strip is supplied and led, with deflection into a coiled path, into a stationary track, which is laterally offset from the supply plane by a film width and corresponds to the path of the film guide passage of a cassette from the outer winding of a roll to its film gate, the coiled one end is then fixed at the end of the track, an adhesive surface of the one end of the film strip being kept free for adhesive tape;
   (b) with the coiled deflection maintained, a further portion of the film strip is supplied and is wound into a coiled roll, from the outside to the inside, within a rotating winding chamber which is joined to the track, and corresponds to the film take-up in a cassette; bringing the film strip to a stand still upon completion of the winding process and cutting it off and simultaneously displacing the cut end laterally by a film width along a contour corresponding to the film guide passage of a cassette, from the inner winding of the coiled roll around the side of the roll to its film gate and pushing it in front of and in line with the said one end of the film strip, where the ends of the film strip are spliced to form an endless roll with the aid of an adhesive tape, and the endless roll is then pushed into a parallel open film cassette by means of an ejector.

2. A method according to claim 1, in which the circumferential speed of the chamber at the deflection is greater than the feed rate of the film strip.

3. An apparatus for loading a cassette with an endless roll from a cut length of film strip disposed in a supply plane having a pair of ends, comprising in succession along a film strip path, a supply roll for the initial containment of the film strip, loop forming means for tension compensation, punching apparatus for making holes in the film strip, a sprocket wheel for forwarding the film strip with associated pressure members for stopping the film strip, means for cutting the film strip, a shaped part mounted on the end of a shaft and arranged behind a guide element as a winding apparatus, said shaped part containing a winding chamber with a passage beginning on the periphery having an inner wall and an outer wall, clamping elements in the shaped part for clamping the film strip, the inner wall corresponds to the path of a cassette passage and the outer wall ends after a predetermined length in front of the clamping elements for clamping the film strip, an adhesive tape mechanism adjacent to the clamping elements; a transporting arm is movably mounted adjacent the winding apparatus, the transporting arm having a grasping end which is constructed and arranged so as to grasp and so as to move the said free end of the film strip from the cutting means in the supply plane to the clamping elements in the track and an ejector is mounted adjacent the winding chamber for the ejection of the cassette film from the shaped part.

4. An apparatus according to claim 3 in which the said shaped part comprises the take-up elements for a cassette.

* * * * *